(12) United States Patent
Schmidt et al.

(10) Patent No.: US 11,976,678 B2
(45) Date of Patent: *May 7, 2024

(54) MATERIAL FLOW MODIFIER AND APPARATUS COMPRISING SAME

(71) Applicant: Vortex Pipe Systems LLC, Austin, TX (US)

(72) Inventors: Paul Wayne Schmidt, Carlton, OR (US); Avijit Ghosh, Austin, TX (US)

(73) Assignee: Vortex Pipe Systems LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,514

(22) Filed: Feb. 24, 2023

(65) Prior Publication Data

US 2023/0235760 A1    Jul. 27, 2023

Related U.S. Application Data

(63) Continuation of application No. 17/184,347, filed on Feb. 24, 2021, now Pat. No. 11,624,381, which is a continuation of application No. 17/021,602, filed on Sep. 15, 2020, now Pat. No. 11,002,301.

(51) Int. Cl.
    *F15D 1/06*    (2006.01)
(52) U.S. Cl.
    CPC .................... *F15D 1/065* (2013.01)
(58) Field of Classification Search
    CPC .................... F15D 1/065; F16L 55/02772
    USPC .................... 138/39, 115, 116, 117, 122
    See application file for complete search history.

(56) References Cited

U.S. PATENT DOCUMENTS

| 1,496,345 | A | 6/1924 | Lichtenhaeler |
| 1,500,103 | A | 7/1924 | Burdon et al. |
| 1,513,624 | A | 10/1924 | Parker |
| 1,777,141 | A | 9/1930 | Howden |
| 1,959,907 | A | 5/1934 | Ebert |

(Continued)

FOREIGN PATENT DOCUMENTS

| EP | 1134476 A1 | 9/2001 |
| GB | 2312276 A | 10/1997 |
| RU | 2670283 C1 | 10/2018 |

OTHER PUBLICATIONS

International Search Authority, Notification of Transmittal of the International Search Report and Written Opinion of the International Search Authority, PCT/US2019/0151468, 14 pages.

*Primary Examiner* — David R Deal
(74) *Attorney, Agent, or Firm* — David O. Simmons; IVC Patent Agency

(57) ABSTRACT

Material flow modifiers as disclosed herein overcome drawbacks associated with known adverse flow conditions (e.g., surface erosion, head losses, particulate drop-out, and the like) that arise from flow of certain types of materials (e.g., fluids, slurries, particulates, flowable aggregate, and the like) through a material flow conduit. Such material flow modifiers provide for flow of flowable material within a flow passage of a material flow conduit (e.g., a portion of a pipeline, tubing or the like) to have a rotational flow profile. Advantageously, the rotational flow profile centralizes flow toward the central portion of the flow passage, thereby reducing magnitude of laminar flow to overcome the aforementioned adverse flow conditions.

26 Claims, 6 Drawing Sheets
(1 of 6 Drawing Sheet(s) Filed in Color)

(56) References Cited

U.S. PATENT DOCUMENTS

| | | | |
|---|---|---|---|
| 1,974,110 A | | 9/1934 | Higley |
| 2,274,599 A | | 2/1942 | Freeman |
| 2,300,130 A | | 10/1942 | McCurdy |
| 2,784,948 A | | 3/1957 | Pahl et al. |
| 2,816,518 A | | 12/1957 | Daggett |
| 2,831,754 A | | 4/1958 | Manka |
| 3,122,171 A | * | 2/1964 | Britton .................. F16L 11/16 138/122 |
| 4,204,775 A | | 5/1980 | Speer |
| 4,339,918 A | | 7/1982 | Michikawa |
| 4,474,726 A | | 10/1984 | Ohta et al. |
| 5,423,353 A | | 6/1995 | Sorensen |
| 5,727,598 A | | 3/1998 | Stuhlreyer |
| 5,743,637 A | | 4/1998 | Ogier |
| 5,765,598 A | | 6/1998 | Goddard et al. |
| 5,909,959 A | | 6/1999 | Gerich |
| 5,992,465 A | | 11/1999 | Jansen |
| 6,564,831 B1 | | 5/2003 | Sanoner et al. |
| 7,849,885 B2 | | 12/2010 | Olsen et al. |
| 8,033,714 B2 | | 10/2011 | Nishioka et al. |
| 8,955,553 B2 | | 2/2015 | Sheldrake et al. |
| 10,092,886 B2 | | 10/2018 | Kashihara et al. |
| 10,201,786 B2 | * | 2/2019 | Okada .................. B01F 25/433 |
| 11,002,301 B1 | * | 5/2021 | Schmidt .................. F15D 1/065 |
| 11,624,381 B2 | * | 4/2023 | Schmidt .................. F15D 1/065 138/39 |
| 2008/0308169 A1 | | 12/2008 | Nielsen et al. |
| 2010/0307830 A1 | | 9/2010 | Poyyapakkam et al. |
| 2012/0285173 A1 | | 11/2012 | Poyyapakkam et al. |
| 2016/0270893 A1 | | 9/2016 | Tapocik |
| 2017/0306994 A1 | | 10/2017 | Schmidt et al. |
| 2022/0074535 A1 | * | 3/2022 | Fortunato ............. F16L 55/041 |

\* cited by examiner

MATERIAL FLOW MODIFIER AND APPARATUS COMPRISING SAME

CROSS-REFERENCE TO RELATED APPLICATIONS

This patent application claims priority as a continuation from U.S. Non-Provisional patent application Ser. No. 17/184,347, filed 24-February 2021, entitled "MATERIAL FLOW MODIFIER AND APPARATUS COMPRISING SAME," now U.S. Pat. No. 11,624,381, which claims priority as a continuation from U.S. Non-Provisional patent application Ser. No. 17/021,602, filed 15-September 2020, entitled "MATERIAL FLOW MODIFIER AND APPARATUS COMPRISING SAME", now U.S. Pat. No. 11,002,301, these application, having a common applicant herewith and being incorporated herein in their entirety by reference.

FIELD OF THE DISCLOSURE

The disclosures made herein relate generally to structural devices used for transmission of flowable materials and, more particularly, to devices used for enhancing flow attributes of material within a material flow conduit such as a pipeline or a tubular flow member.

BACKGROUND

The need to flow materials (i.e., flowable material) through a material flow conduit is well known. Examples of such materials include, but are not limited to, fluids, slurries, particulates, particulate-filled fluid, flowable aggregate, and the like. Examples of such material flow conduit include, but are not limited to, pipes, pipelines, conduits, tubular flow members, and the like.

As shown in FIG. 1, conventional flow of flowable material 5 within a flow passage 10 of a material flow conduit 15 has a flow profile characterized by laminar flow effect (i.e., laminar flow 20). The parabolic flow profile is a result of the laminar boundary layer along the surface of the material flow conduit 15 defining the flow passage 10. Flowable material at the surface of the flow passage 10 exhibits considerable friction and zero flow velocity, thereby reducing velocity of the flowable material even at a considerable distance from the surface of the flow passage 10. In association with this reduced velocity, the laminar flow effect (e.g., friction at the surface of the material flow conduit) is known to increase head loss and heating of the flowable material.

There are various well-known flow considerations that arise when flowable material and, particularly abrasive flowable material, flows through a material flow conduit such as a pipeline. One such consideration is erosion (i.e., wearing) of the material flow conduit. Transport and pumping flowable material comprising abrasive contents, such as coal and sand slurries, wet sand, gravel and the like can cause especially high costs associated with component wear due to interaction between the flowable material and the surface defining the passage through which such material flows. Additionally, uneven erosion in piping systems, especially elbow fittings, is well known to lead to fitting failure or early fitting replacement, either of which is costly in material, manpower and downtime.

When fluids or flowable materials pass through an elbow fitting, the change in direction creates turbulent conditions, flow separation and vortex shedding along the pipe wall at the inside of the bend. This change in direction may also create standing eddies causing backflow conditions at points along the elbow fitting pipe walls. These conditions generally cause the elbow fitting pipe wall along the outside of the bend to erode substantially faster than the pipe wall along the inside of the bend because the flowable material impinges directly against the wall along the outside of the bend as it enters the fitting and changes direction. Additionally, due to centrifugal force, heavier solids and particulates are generally thrown to the outside wall as the flowable material changes direction and tend to continually scour the outer wall.

A similar uneven erosion effect is often experienced in straight pipe runs. For example, the concentration of particulates of a flowable material will increase in the lower region of the fluid in long straight runs (i.e., particulate dropping out of suspension), making the bottom portion of the fluid stream more abrasive or prone to material deposition and/or aggregation than the upper portion. Such material deposition and/or aggregation can alter fluid flow conditions (e.g., velocity, temperature, pressure and the like) and can alter the material composition of the flowable material (e.g., less downstream concentration of particulate than required or intended). Additionally, in large diameter piping systems, the weight of the flowable material is borne by the lower pipe wall portion thereby causing higher erosion rates.

Another well-known flow consideration that arises is head loss due to turbulence and flow separation in an elbow fitting. Higher pumping pressures can be utilized for mitigating this head loss resulting from such head losses. However, higher pumping pressures are generally implemented at the expense of higher energy consumption and associated cost. Additionally, implementation of higher pumping pressures often creates vibration and heating problems in the piping system.

Long radius elbow fittings and pipe sections can reduce these adverse flow considerations. However, long radius fittings require a great deal of space relative to standard (i.e., short) radius fittings. Additionally, long radius fittings still suffer accelerated erosion rates along the pipe wall along the outside of the bend because centrifugal force still causes heavier, more abrasive flowable materials to be thrown to the outer wall, and they are continually scoured by on-going flow of such flowable material.

Therefore, a device that overcomes one or more drawbacks associated with known flow considerations that arise from flow of abrasive and/or particulate-filled material flowing through a material flow conduit would be beneficial, desirable and useful.

SUMMARY OF THE DISCLOSURE

Embodiments of the disclosures made herein are directed to a device that overcomes one or more drawbacks associated with known adverse flow conditions in pipe structures. These drawbacks include, for example, surface erosion, head losses, fluid cavitation, heating, particulates dropping out of suspension, material composition changes, and the like. These adverse flow conditions are known to arise from flow of certain types of materials (e.g., fluids, slurries, particulates, particulate-filled fluid, flowable aggregate, and the like) through a material flow conduit. A material flow modifier in accordance with one or more embodiments of the disclosures made herein enables flow of flowable material within a flow passage of a material flow conduit (e.g., a portion of a pipeline, tubing or the like) to have a rotational flow profile—i.e., sometimes referred to as cyclonic or vortex flow. Advantageously, such a rotational flow profile centralizes flow toward a central portion of the flow passage, thereby reducing the magnitude of laminar flow. Such rotational flow profile provides a variety of other advantages as compared to a parabolic flow profile resulting from laminar flow (e.g., increased flow rate, reduce inner pipeline wear, more uniform inner pipe wear, reduction in energy consumption, reduced or eliminated slugging, maintaining particulates in fluid suspension and the like).

Advantageously, material flow modifiers in accordance with one or more embodiments of the disclosures made herein are especially efficient and effective at keeping particles suspended with a fluid, thereby aiding in keeping the particle-filled material continuous/free flowing and providing unrestricted material flow passages. Moreover, in material flow systems having existing build-up of materials in the bottom and/or other portion of the fluid flow conduit, material flow modifiers in accordance with one or more embodiments made herein create a rotational flow profile that enhances the flow of material through fluid flow conduit having surface obstructions (e.g., material deposits and/or particles having fallen out of suspension), and in some instances, such rotational flow profile can serve to remove all or a portion of such existing build-up of materials.

In one or more embodiment, a material flow modifier comprises an interior tubular body and a plurality of helical passage bodies. The interior tubular body has an interior surface and an exterior surface. The interior surface defines a central passage of the interior tubular body. The central passage of the interior tubular body has a generally round cross-sectional shape. The central passage of the interior tubular body expands along a length thereof from a smallest cross-sectional area at or near (i.e., adjacent) an inlet of the interior tubular body to a largest cross-sectional area at or near an outlet of the interior tubular body. The plurality of helical passage bodies each surround and extend along a length of the interior tubular body. Each of the helical passage bodies defines a helical passage therein extending along a length thereof. The helical passage of each of the helical passage bodies has an inlet at or near to the inlet of the interior tubular body and an outlet at or near to the outlet of the interior tubular body. Each helical passage tapers along a respective length thereof from a largest cross-sectional area at or near the inlet thereof to a smallest cross-sectional area at or near the outlet thereof.

In one or more embodiments, a material flow modifier comprises an exterior tubular body, an interior tubular body and a plurality of helix vanes. The exterior tubular body has a central passage extending therethrough and defining a centerline longitudinal axis thereof. The central passage of the exterior tubular body has a generally round cross-sectional shape. The interior tubular body is within the central passage of the exterior tubular body. A central passage of the interior tubular body has a generally round cross-sectional shape. A centerline longitudinal axis of the central passage of the interior tubular body extends colinearly with the centerline longitudinal axis of the exterior tubular body. The central passage of the interior tubular body expands along a length thereof from a smallest cross-sectional area at or near (i.e., adjacent) a first end portion of the exterior tubular body to a largest cross-sectional area at or near a second end portion of the exterior tubular body. Each of the helix vanes extends between an interior surface of the exterior tubular body and an exterior surface of the interior tubular body thereby defining a plurality of helical passages between the exterior tubular body, the interior tubular body and respective adjacent ones of the helix vanes. Each of the helical passages tapers along a respective length thereof from a largest cross-sectional area at or near the first end portion of the exterior tubular body to a smallest cross-sectional area at or near the second end portion of the exterior tubular body.

In one or more embodiments, a material flow modifying apparatus comprises an inlet flow body, a material flow modifier having a first end portion thereof attached to the inlet flow body and an outlet flow body attached to a second end portion of the material flow modifier. The material flow modifier comprises an interior tubular body and a plurality of helical passage bodies surrounding and extending along a length of the interior tubular body. The interior tubular body has an interior surface and an exterior surface. The interior surface defines a central passage of the interior tubular body. The central passage of the interior tubular body has a generally round cross-sectional shape and expands along a length thereof from a smallest cross-sectional area at or near an inlet of the interior tubular body to a largest cross-sectional area at or near an outlet of the interior tubular body. Each of the helical passage bodies defines a helical passage therein extending along a length thereof. The helical passage of each of the helical passage bodies has an inlet adjacent to the inlet of the interior tubular body and an outlet adjacent to the outlet of the interior tubular body. Each helical passage tapers along a respective length thereof from a largest cross-sectional area at or near the inlet thereof to a smallest cross-sectional area at or near the outlet thereof. The outlet of the interior tubular body and the outlet of each of the helical passages are in fluid communication with the central passage of the outlet flow body.

In one or more embodiments, a portion of the interior tubular body is a wall of each of the helical passage bodies.

In one or more embodiments, the cross-sectional area of the central passage of the interior tubular body expands linearly along the length thereof between the inlet and outlets of the interior tubular body.

In one or more embodiments, the inlet of each of the helical passages and the inlet of the central passage of the interior tubular body at least partially lie in a common plane.

In one or more embodiments, the outlet of each of the helical passages and the outlet of the central passage of the interior tubular body at least partially lie in a common plane.

In one or more embodiments, an outer wall of each of the helical passage bodies is cylindrical.

In one or more embodiments, the cylindrical outer wall of all of the helical passage bodies have a uniform wall thickness along a length thereof.

In one or more embodiments, a centerline longitudinal axis of the central passage of the interior tubular body extends colinearly with a centerline longitudinal axis of the cylindrical outer wall of all of the helical passage bodies.

In one or more embodiments, the helical passage bodies jointly define an exterior wall and/or surface of the material flow modifier.

In one or more embodiments, each of the helical passage bodies has an outer wall, an inner wall and opposing sides walls.

In one or more embodiments, the inner wall of each of the helical passage bodies is a respective portion of a wall defining the interior tubular body.

In one or more embodiments, each of the opposing walls is a helix vane extending between the outer and inner walls.

In one or more embodiments, the inlet flow body, the interior tubular body and the outlet flow body each have a central passage defining a respective centerline longitudinal axis and each of the centerline longitudinal axes extends colinear with each other one of the centerline longitudinal axes.

In one or more embodiments, the inlet flow body and the outlet flow body each have an upstream end portion and a downstream end portion; the first end portion of the material flow modifier is attached to the downstream end portion of inlet flow body; the second end portion of the material flow modifier is attached to the upstream end portion of outlet flow body; a cross-sectional area of the central passage in the downstream portion of the inlet flow body is greater than a cross-sectional area of the central passage in the upstream portion of the inlet flow body; and a cross-sectional area of the central passage in the upstream portion of the outlet flow body is greater than a cross-sectional area of the central passage in the downstream portion of the outlet flow body.

These and other objects, embodiments, advantages and/or distinctions of the disclosures made herein will become readily apparent upon further review of the following specification, associated drawings and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
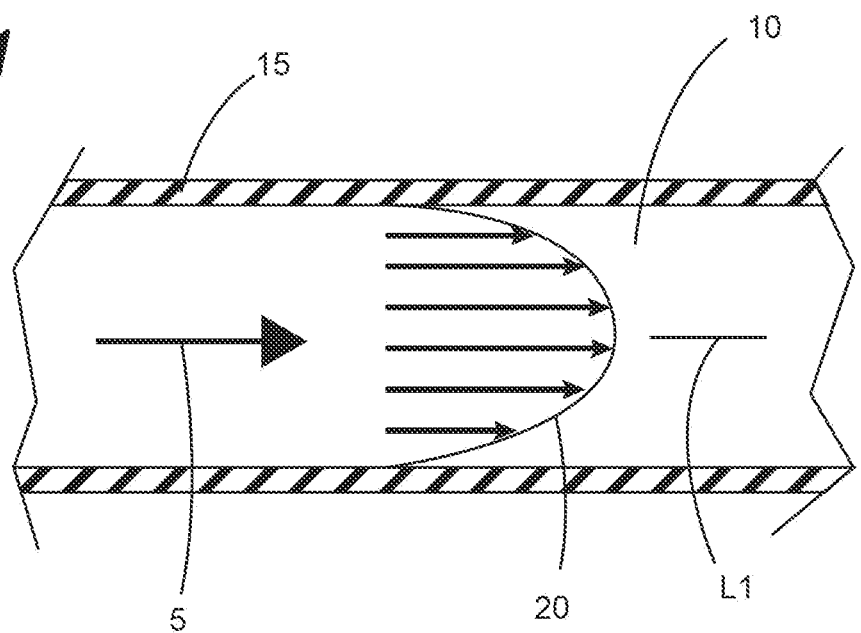
FIG. 1 is a diagrammatic view showing laminar flow effect within a material flow conduit.

Embodiments of the disclosures made herein are directed to material flow modifiers. Such material flow modifiers are preferably passive devices that have no parts that actively move during operation. Rather, these material flow modifiers preferably operate on the existing flow velocity of a pumping system within fluid flow apparatus comprising the pumping system. Accordingly, when there is flow velocity in the fluid flow apparatus, a material flow modifier in accordance with the disclosures made herein is preferably always operational. Utilization of a material flow modifier as disclosed herein can include inserting a material flow modifier inline within an existing pipe structure of a fluid flow apparatus or configuring the material flow modifier as a length of fluid flow conduit. Material flow modifiers is sized to be compatible with (e.g., match) flow rates of the existing pipe structure.

As discussed above in reference to FIG. 1, conventional flow of flowable material 5 within the flow passage 10 of the material flow conduit 15 has a flow profile characterized by laminar flow effect (i.e., laminar flow 20). However, material flow modifiers in accordance with the disclosures made herein (e.g., the material flow modifier 1 shown in FIG. 2) are advantageously configured in a manner that causes conventional flow to be transformed from a flow profile characterized by laminar flow effect to a flow profile being characterized by rotational flow effect 25—i.e., rotational flow sometimes referred to as cyclonic or vortex flow. The rotational flow effect is the result of rotational movement of the flowable material 5 about the longitudinal axis L1 of the material flow conduit 15 as generated by the material flow modifier 1.

Figure 2:
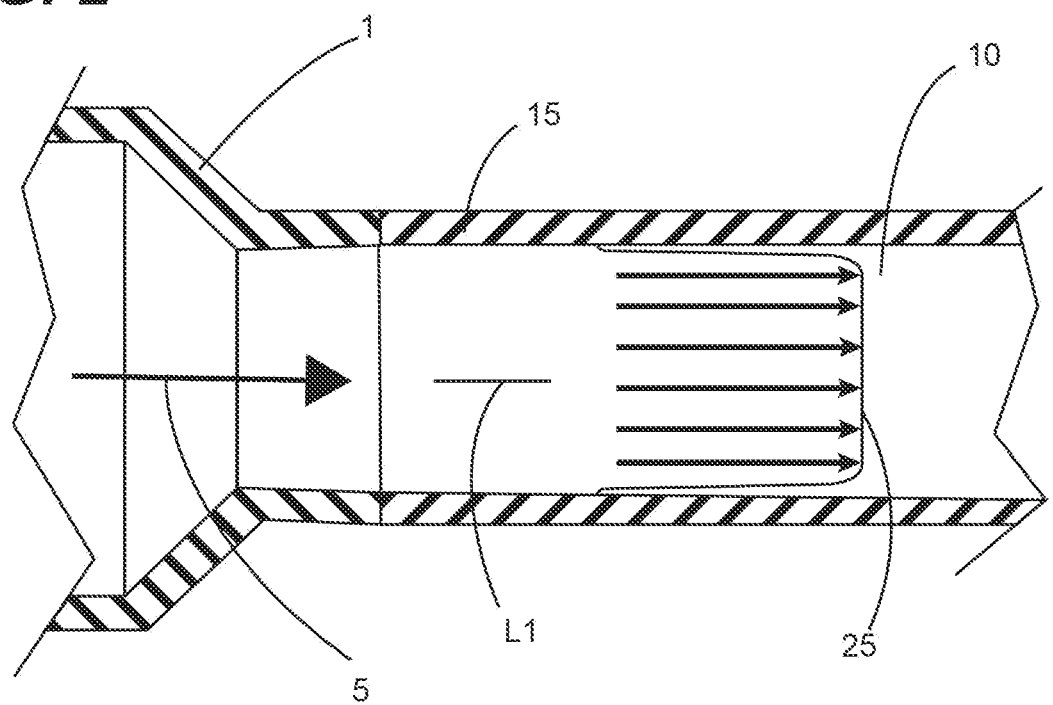
FIG. 2 is a diagrammatic view showing conversion from a laminar flow effect to rotation flow effect by a material flow modifier configured in accordance with one or more embodiments of the disclosures made herein.

As a person of ordinary skill in the art will understand, rotational flow provides greater average flow velocity and volumetric flow than laminar flow for a given material flow conduit (e.g., as depicted in FIGS. 1 and 2). Additionally, rotational flow mitigates adverse interaction between the surface of the material flow conduit and the flowable material. These advantageous aspects of rotational flow arise from the rotational flow profile accelerating and centralizing flow of the flowable material toward the central portion of the flow passage 10, thereby mitigating associated adverse flow conditions (e.g., particulate falling out of suspension) and amplifying flow magnitude. In this regard, material flow modifiers in accordance with the disclosures made herein beneficially provide rotational flow that transports flowable materials more effectively and efficiently than in conventional piping systems exhibiting laminar flow.

Referring now to FIGS. 3-7, specific aspects of a material flow modifier in accordance with one or more embodiments of the disclosures made herein (i.e., material flow modifier 100) are discussed. The material flow modifier 100 includes an exterior tubular body 102, an interior tubular body 104 and a plurality of helix vanes 106. The exterior tubular body 102 has a central passage 108 extending therethrough and defining a centerline longitudinal axis L2 of the exterior tubular body 102. The central passage 108 of the exterior tubular body 102 preferably has a generally round cross-sectional shape.

Figure 4:
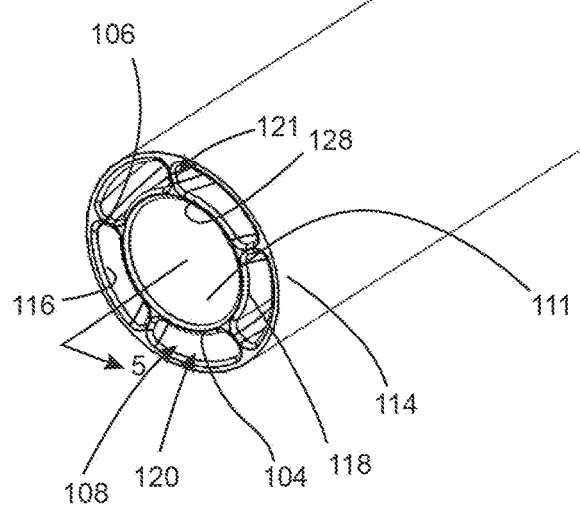
FIG. 4 is a second perspective view of material flow modifier shown in FIG. 3.
Figure 5:
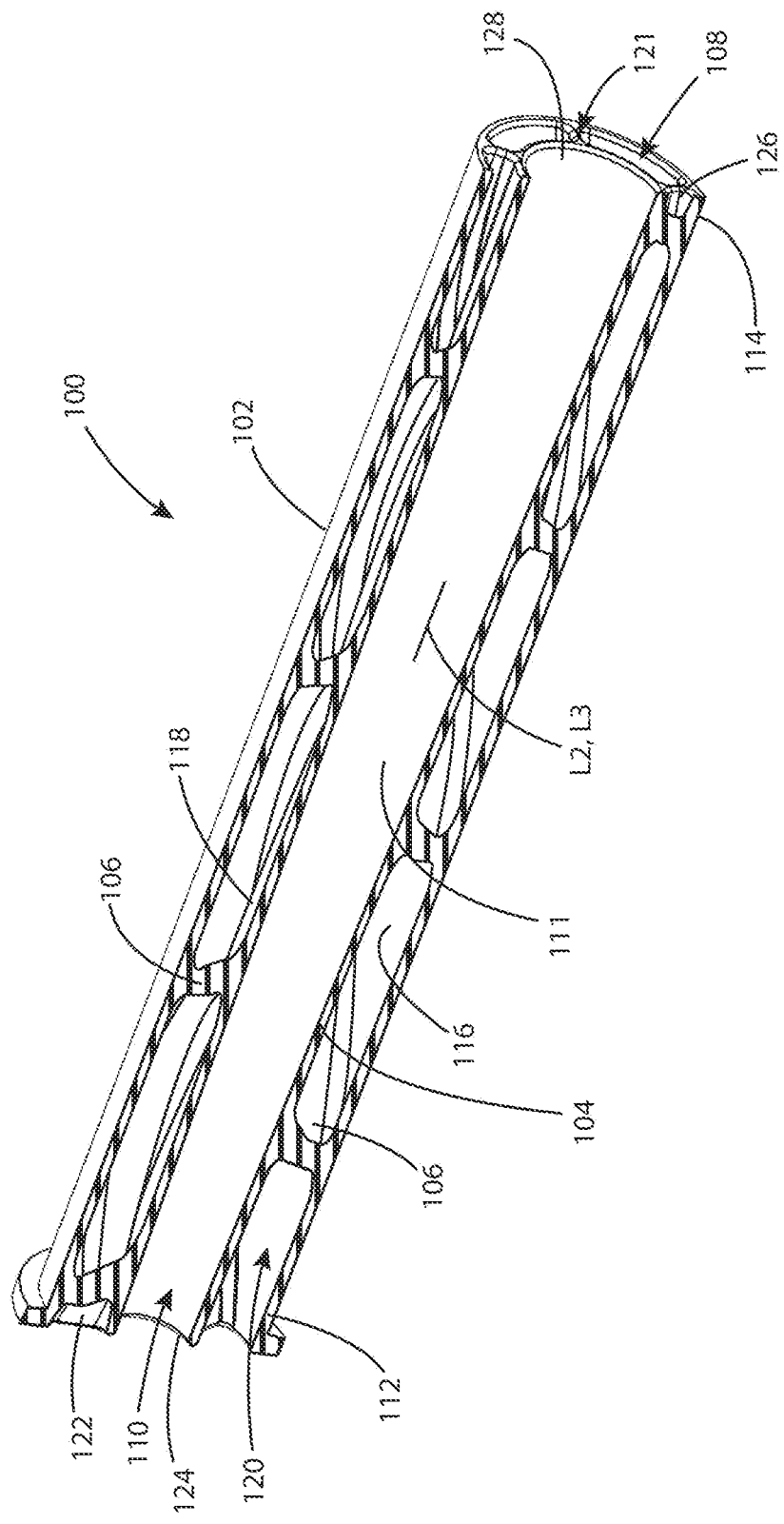
FIG. 5 is a cross-sectional view taken along the line 5-5 in FIG. 4.

The interior tubular body 104 is within the central passage 108 of the exterior tubular body 102. A central passage 110 of the interior tubular body 104, defined by an interior surface 111 of the interior tubular body 104, preferably has a generally round cross-sectional shape. A centerline longitudinal axis L3 of the central passage 110 of the interior tubular body 104 preferably extends colinearly with the centerline longitudinal axis L2 of the exterior tubular body 102 (e.g., a cylindrical wall thereof). The central passage 110 of the interior tubular body 104 expands along a length thereof from a smallest cross-sectional area adjacent a first end portion 112 of the exterior tubular body 102 to a largest cross-sectional area adjacent a second end portion 114 of the exterior tubular body 102. Preferably, the cross-sectional area of the central passage 110 of the interior tubular body 104 expands linearly along a length of the interior tubular body 104—i.e., as illustrated in FIG. 4 as a straight-tapered conical structure). In the context of the disclosures made herein, adjacent preferably means at (e.g., at the first end portion) but less preferably adjacent can also mean near (e.g., near the first end portion). It is disclosed herein that the cross-sectional area of the central passage 110 of the interior tubular body 104 can expand non-linearly along the length of the interior tubular body 104.

Figure 3:
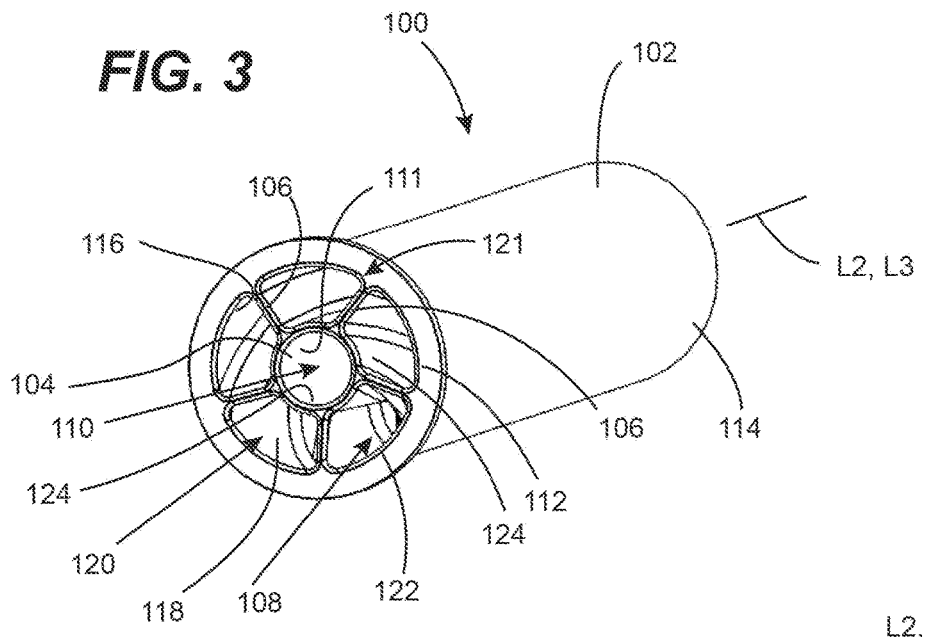
FIG. 3 is a first perspective view of material flow modifier configured in accordance with one or more embodiments of the disclosures made herein.
Figure 6:
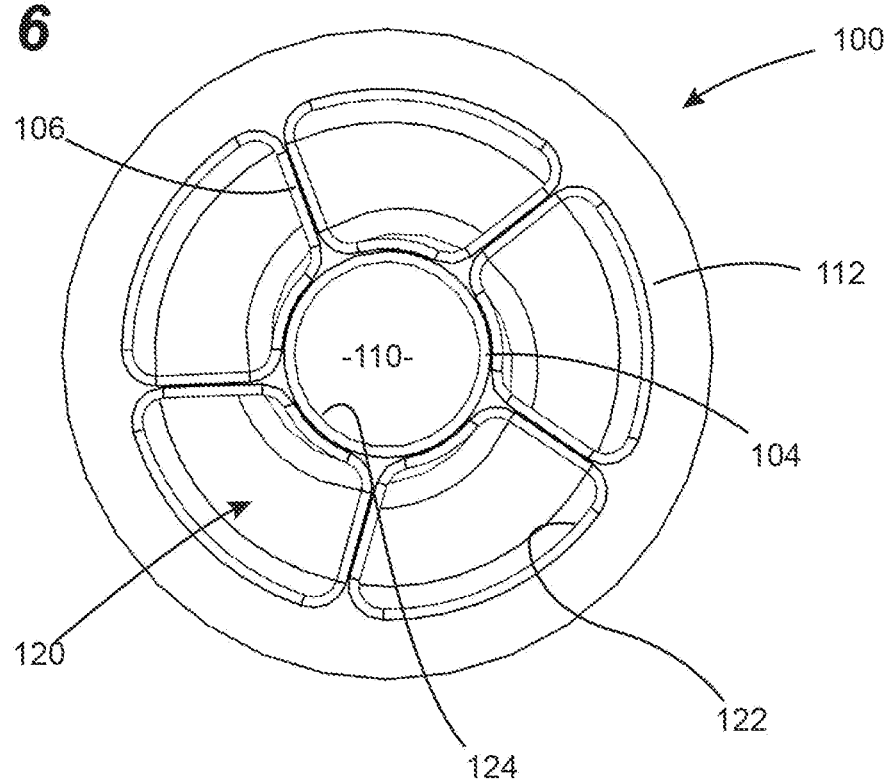
FIG. 6 is an inlet end view of the material flow modifier shown in FIG. 3.
Figure 7:
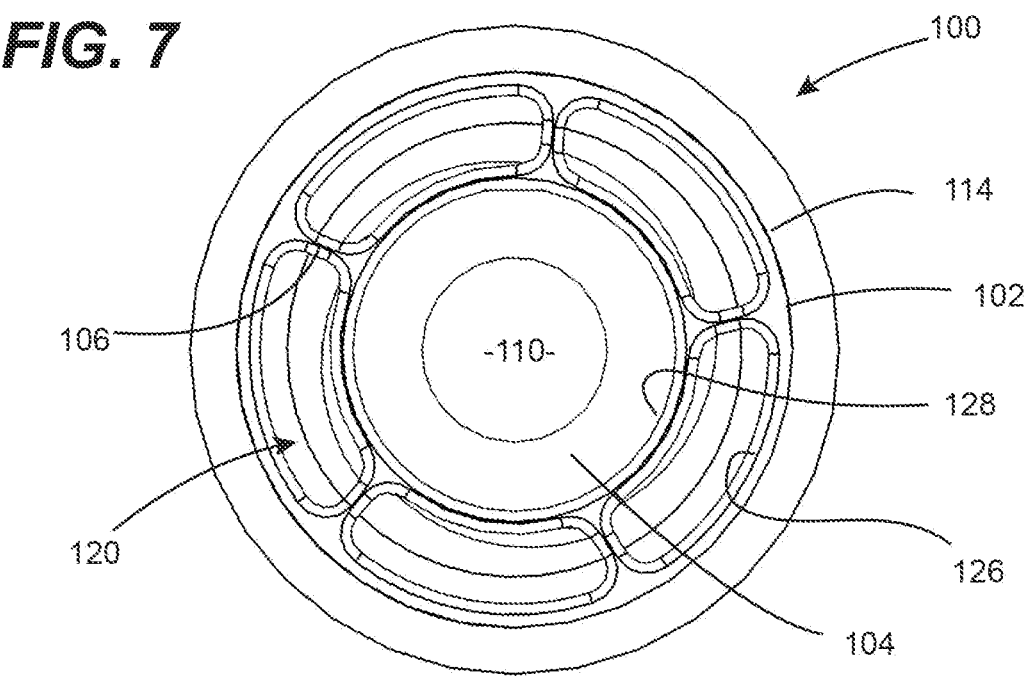
FIG. 7 is an outlet end view of the material flow modifier shown in FIG. 3.

The plurality of helix vanes 106 are within the central passage 108 of the exterior tubular body 102. Each of the helix vanes 106 extends between an interior surface 116 of the exterior tubular body 102 and an exterior surface 118 of the interior tubular body 104. In this manner, a plurality of helical passages 120 are defined between the exterior tubular body 102, the interior tubular body 104 and respective adjacent ones of the helix vanes 106. More specifically, each of the helical passages 120 extends within a respective helical passage body 121 that surrounds and extends along a length of the interior tubular body 104. As best shown in FIGS. 6 and 7, each of the helical passage bodies 121 has an outer wall (i.e., a respective portion of the exterior tubular body 102), an inner wall (i.e., a respective portion of the interior tubular body 104) and opposing sides walls (i.e., each defined by a respective one of the helix vanes 106). As best shown in FIG. 3, the inner walls of each helical passage body 121 can be angled off by up to about 12 degrees. This profile aids in directing fluid flow into each helical passage body 121 with minimum resistance. Additionally, this profile opposes any back wall forces in the chambers and adds strength to the material flow modifier.

The helical passage 120 of each of the helical passage bodies 121 has an inlet 122 adjacent to an inlet 124 of the central passage 110 of the interior tubular body and an outlet 126 adjacent to an outlet 128 of the central passage 110 of the interior tubular body 104. Preferably, the plurality of helical passage bodies 121, the exterior tubular body 102 and the interior tubular body 104 are all identically or approximately the same length to enable the inlet 122 of each of the helical passages 120 and the inlet 124 of the central passage 110 of the interior tubular body 104 entirely or partially lie in a common plane and to enable the outlet 126 of each of the helical passages 120 and the outlet 128 of the central passage 110 of the interior tubular body 104 entirely or partially lie in a common plane. However, it is contemplated herein that the inlet 122 of each of the helical passages 120 and the inlet 124 of the central passage 110 of the interior tubular body 104 can entirely or partially lie in spaced-apart planes and that the outlet 126 of each of the helical passages 120 and the outlet 128 of the central passage 110 of the interior tubular body 104 can entirely or partially lie in spaced-apart planes.

Each of the helical passages 120 tapers along a respective length thereof from a largest cross-sectional area adjacent the first end portion 112 of the exterior tubular body 102 to a smallest cross-sectional area adjacent the second end portion 114 of the exterior tubular body 102. Preferably, such taper of the helical passages 120 arises as a result of the exterior tubular body 102 being cylindrical and having a generally uniform wall thickness in combination with the interior tubular body 104 having a generally uniform wall thickness and having a cross-sectional area that expands along the length of the interior tubular body 104 from adjacent the first end portion 112 of the exterior tubular body 102 to adjacent the second end portion 114 of the exterior tubular body 102. Optionally, for a given uniform outside diameter of the exterior tubular body 102 and a given expansion of the cross-sectional area of the central passage of the interior tubular body 104, it is disclosed herein that such taper of the helical passages 120 can arise entirely or at least partially as a result of one or more structural considerations of the following: the thickness of the exterior tubular body 102 tapering from a first thickness adjacent to the first end portion 112 of the exterior tubular body 102 to an increased thickness adjacent to the second end portion 114 of the exterior body 102 and the thickness of the interior tubular body 104 tapering from a first thickness adjacent to the first end portion 112 of the exterior tubular body 102 to an increased thickness adjacent to the second end portion 114 of the exterior body 102.

Figure 8:
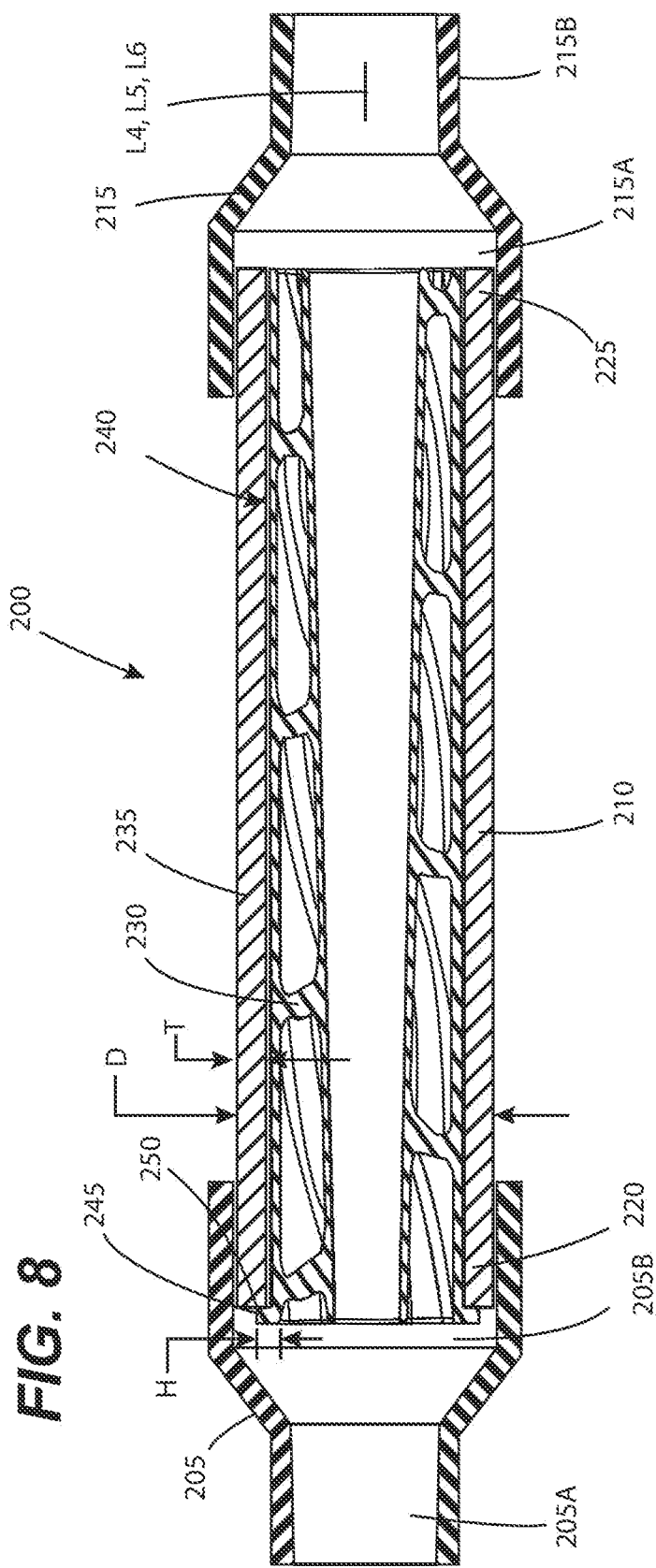
FIG. 8 is a cross-sectional view showing a material flow modifying apparatus configured in accordance with one or more embodiments of the disclosures made herein.

Referring now to FIG. 8, a material flow modifying apparatus in accordance with one or more embodiments of the disclosures made herein (i.e., material flow modifying apparatus 200) is shown. The material flow modifying apparatus 200 comprises an inlet flow body 205, a material flow modifier unit 210 and an outlet flow body 215. The material flow modifier unit 210 has a first end portion 220 attached to the inlet flow body 205 and has a second end portion 225 attached to the outlet flow body 215. The inlet flow body 205, the material flow modifier unit 210 and the outlet flow body 215 are in fluid communication with each other. In preferred embodiments, the inlet flow body 205, the material flow modifier unit 210 and the outlet flow body 215 each have a central passage with a respective centerline longitudinal axis L4-L6 and each of the centerline longitudinal axes L4-L6 extends colinearly with each other one of the centerline longitudinal axes L4-L6.

The material flow modifier unit 210 includes a material flow modifier 230 and a housing 235. The material flow modifier 230 is a material flow modifier in accordance with one or more embodiments of the disclosures made herein. To this end, the material flow modifier 230 can have an overall construction and functionality similar to that the material flow modifier 100 discussed above in reference to FIGS. 3-7.

The material flow modifier 230 can be engaged within a central passage 240 (i.e., an interior space) of the housing 235. Engagement of the material flow modifier 230 within the central passage 240 of the housing 235 enables the housing to carry all or a portion of the structural load (e.g., radial stress and strain) arising from the flow of pressurized fluid though the material flow modifier unit 210. As shown, in one or more embodiments, the housing 235 is of a cylindrical construction (e.g., a length of pipe or tubing). In other embodiments, the housing 235 can be of a non-tubular cylindrical construction—e.g., a housing with a non-round central passage where one or more mating surfaces of the material flow modifier 230 engage one or more surfaces of the non-round central passage to limit unrestricted rotational movement therebetween. One or more outside dimensions of the material flow modifier 230 (e.g., an outside dimension D) can be configured for enabling the material flow modifier 230 to be positioned within the central passage 240 of the housing 235 in a manner that limits radial translation, pivotal translation or a combination thereof.

The material flow modifier 230 can include a flange 245 at the first end portion 220 to engage a mating surface of the housing 235 (e.g., an end face 250 thereof) for limiting unrestricted axial movement therebetween. In preferred embodiments, a height H of the flange 245 is approximately the same as a height of the mating surface of the housing 235 (e.g., wall thickness T). In one or more other embodiments, a securement device can be used for limiting unrestricted axial and/or rotational movement between the material flow modifier 230 and the housing 235—e.g., a welded interface, an adhesive interface, a circular-clip in a groove, a threaded fastener engaged in a threaded hole, a threaded fastener extending through an aperture and engaged in a threaded hole, and the like.

It is disclosed herein that, in one or more embodiments, the housing 235 of the material flow modifier unit 210 can be omitted, whereby the inlet flow body 205 and the outlet flow body 215 can be attached directly to opposing end portions of the material flow modifier 230. Such omission of the housing 235 can require a specific configuration of certain structural aspects of the material flow modifier 230 to be taken into consideration. One such consideration is a thickness of an outer wall 232A of the material flow modifier 230 being of a suitable strength for containing pressure within the material flow modifier 230. Another such consideration is removing the flange 245 to eliminate any adverse/undesirable interference between the flange 245 and the inlet flow body 205.

In one or more embodiments, as shown, the inlet flow body 205 and the outlet flow body 215 each have an upstream end portion 205A, 215A, respectively, and a downstream end portion 205B, 215B, respectively. The first end portion 220 of the material flow modifier 230 is attached to the downstream end portion 205B of inlet flow body 205 and the second end portion 225 of the material flow modifier 230 is attached to the upstream end portion 215A of outlet flow body 215. A cross-sectional area of the central passage in the downstream portion 205B of the inlet flow body 205 is greater than a cross-sectional area of the central passage in the upstream portion 205A of the inlet flow body 205. A cross-sectional area of the central passage in the upstream portion 215A of the outlet flow body 215 is greater than a cross-sectional area of the central passage in the downstream portion 215B of the outlet flow body 215. In view of the total material flow areas of the material flow modifier 230, this cross sectional area profile of the inlet flow body 205 advantageously enables pressure reduction at the inlet of the helix passages and central aperture of the material flow modifier 230, enables flow volume to be maintained through the helix passages and central aperture of the material flow modifier 230, and enables increases flow velocity through the material flow modifier 230.

Turning now to a method of making a material flow modifier apparatus in accordance with the disclosures made herein, in one or more embodiments, a material flow modifier in accordance with the disclosures made herein (e.g., the material flow modifier 230 of FIG. 8) is provided. Next, the material flow modifier is inserted into a central passage of a material flow modifier housing (i.e., the housing 235 of FIG. 8) and is fixedly engaged therewith to limit at least one of unrestricted axial movement, radial movement, pivotal movement and rotational movement. Next, an inlet flow body (i.e., the inlet flow body 205 of FIG. 8) is attached to a first end portion of the housing and an outlet flow body (i.e., the outlet flow body 215 of FIG. 8) is attached to a second end portion of the housing. The inlet flow body and the outlet flow body can each be secured to the housing by means such as, for example, mechanical means (e.g., a flange or shoulder on the material flow modifier, or the like), thermal means (e.g., heat staking, laser joining or the like), metal deposition means (e.g., welding or the like), threaded fastener means (e.g., bolt, screw or the like), adhesive means and/or the like.

In operation, pressurized material flow (e.g., particulate-filled fluid) at the first end portion of a material flow modifier in accordance with one or more embodiments of the disclosures made herein causes a continuous rotational (i.e., vortex) flow of such fluid flow at the downstream side (i.e., outlet) of the material flow modifier. At the inlet region of the material flow modifier, material flow is restricted through the central passage of the interior tubular body. This material flow restriction forces a portion of the material flow into the helical passages and a remaining portion enters the interior tubular body. The portion of the material flow passing through the helical passages whereby a rotational flow around the centerline longitudinal axis of the interior tubular body is generated. As the portion of the material flow passes through the central passage of the interior tubular body, it becomes less restricted thereby allowing the material flow exiting the helical passages to control and transform the material flow exiting the central passage of the interior tubular body. At the outlet of the helical passages, this rotational material flow from the helical passages merges with material flow from the central passage of the interior tubular body. Merging of these material streams creates a harmonious rotational flow in which pipeline pressure is decreased so as to create pipeline fluid acceleration, to evenly distribute suspended particles into the material flow modifier and to keep suspended particles from dropping out of suspension to cause restricted material flow downstream of the material flow modifier.

Because each stream of material flowing from within the plurality of material flow passages are proportional, the greatest rotational spin is achieved downstream from the material flow modifier. Surface and fluid friction causes the rotational flow to decrease over time and distance (i.e., to decay), which can be offset by utilization of multiple inline, spaced-apart material flow modifiers. Additionally, a skilled person will understand that flowable material being forcibly urged through the helical passages, which are all tapered, creates a venturi effect. This venturi effect decreases pressure at the outlet of the material flow modifier. With the pressure decreased, fluid acceleration is created. With less pressure in the material flow system, a pump of the system can operate more efficiently (e.g., using less energy). Moreover, suspended particles in the flowable material will more readily remain in suspension, thereby reducing blockages in material flow conduits (e.g., pipes, pipelines and tubes).

Figure 9:
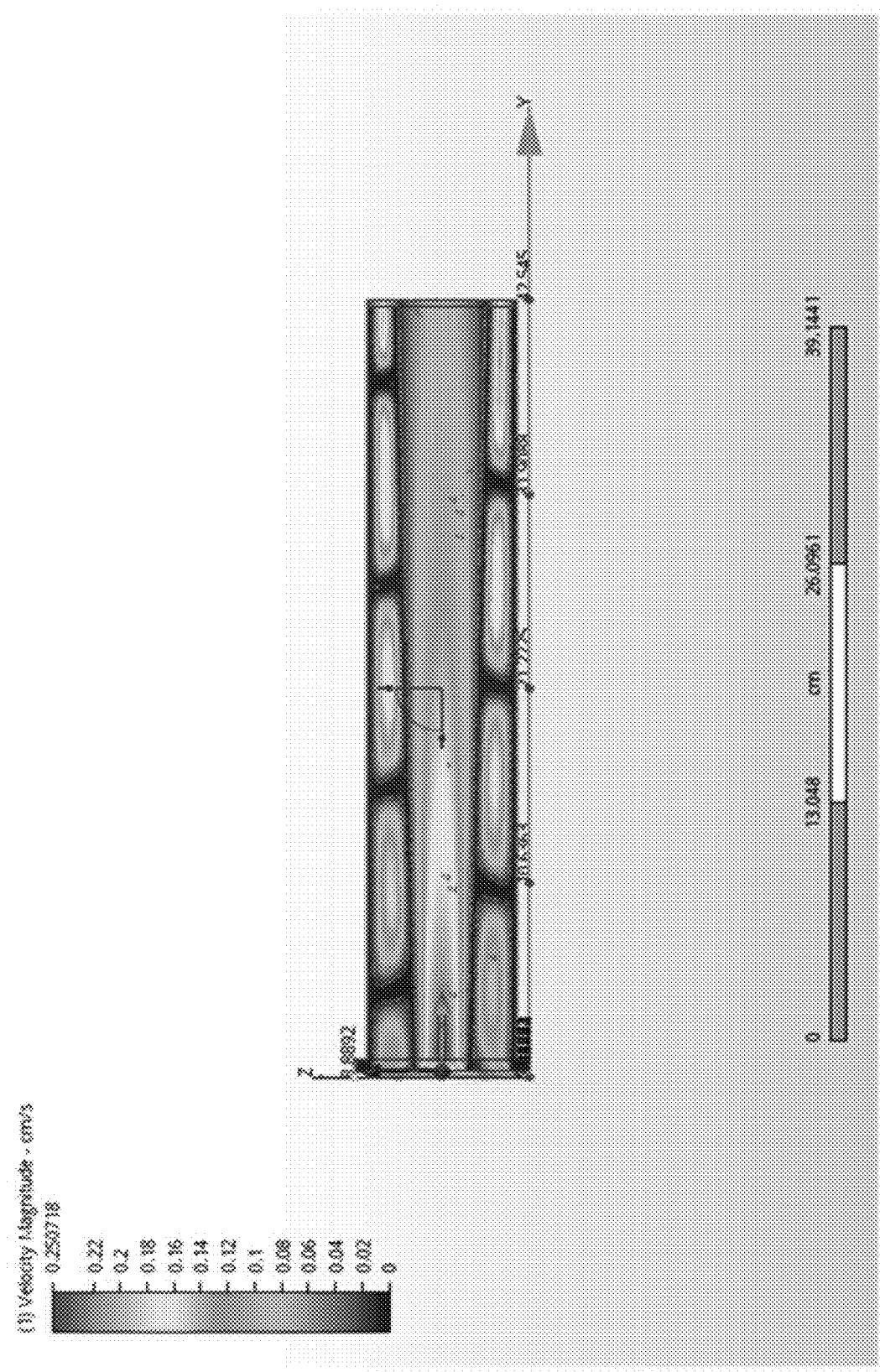
FIG. 9 is a color diagrammatic view showing relative fluid flow velocities for a material flow modifier configured in accordance with one or more embodiments of the disclosures made herein.

In a material flow modifier in accordance with one or more embodiments of the disclosures made herein, the greatest fluid acceleration is at the point where material flow exiting the helical passages to control and transform the material flow exiting the central passage of the interior tubular body. The balance of this material flow motion is a siphoning action and a vortex at the inlet of the material flow modifier. As illustrated in FIG. 9, the material's velocity at the inlet point in the central passage of the interior tubular body is momentarily increased, but is fully diminished at about the half-way point of the interior tubular body. This is at the reference point where the velocity begins substantial increase within the helical passages and sustains this velocity increase to the exit of the helical passages. This reference point is variable and floats off center as pumping flows are increased or lowered. Moreover the structural configuration of the material flow modifier results in a draft over its entire inlet area thereby generating a siphoning effect upstream of the material flow modifier. This upstream siphoning effect creates a vortex at the inlet of the material flow modifier starting the first step in changing the flow from parabolic to rotational.

Material flow modifiers in accordance with the disclosures made herein have a plurality of flow modification variables that can influence the manner in which they modify fluid flow. These variables include, but are not limited to, number of helical passages, total angular wrap of helical passages along the length of the material flow modifier, ratio of total flow inlet area of the helical passages to the total flow inlet area (i.e., area of helical passages and interior tubular body), ratio of total flow outlet area of the helical passages to the total flow outlet area (i.e., area of helical passages and interior tubular body), total flow inlet area, total flow outlet area, spacing of the helical passages (e.g., equally spaces vs. unequally spaced), mode of cross-sectional area transition for the central passage of the interior tubular body (e.g., linearly vs. non-linearly), mode of cross-sectional area transition for the helical passages (e.g., linearly vs. non-linearly). To achieve a desired flow modification characteristic, one or more of these flow modification variables can be altered to achieve the desired flow modification.

In one or more embodiments of a material flow modifier in accordance with the disclosures made herein, the following flow modification variables are prescribed: equally-spaced helical passages and passageways; the total cross-sectional inlet area of all of the helical passages is up to 80% of the total inlet area; the total cross-sectional outlet area of all of the helical passages is about 20% of the total inlet area; the cross-sectional area of each helical passage at any given axial location of the material flow modifier over its linear length are all equal; and over the length of the material flow modifier, each helical passage has about a 250-degrees to 290-degree scroll and, preferably, about 270-degrees. A given reduction in helical passage cross-sectional area in combination with a given count of scroll contributes to determination of a length of a material flow modifier. In one or more other embodiments, the total cross-sectional inlet area of all of the helical passages is up to 60% of the total inlet area and the total cross-sectional outlet area of all of the helical passages is about 30% of the total inlet area. In one or more other embodiments, the total cross-sectional inlet area of all of the helical passages is between 60%-80% of the total inlet area and the total cross-sectional outlet area of all of the helical passages is between 20%-30% of the total inlet area. In still one or more other embodiments, the total cross-sectional inlet area of all of the helical passages is between 50%-70% of the total inlet area and the total cross-sectional outlet area of all of the helical passages is between 30%-40% of the total inlet area.

Material flow modifiers in accordance with embodiments of the disclosures made herein are useful with all types of piping requirements such as, for example, chemical, heavy slurry, concrete pumping devices, sewage, and FDA food grade transfer systems. Material flow modifiers in accordance with embodiments of the disclosures made herein can be of a one-piece construction. Material flow modifiers in accordance with embodiments of the disclosures made herein can be of a multi-piece construction. Material flow modifiers in accordance with embodiments of the disclosures made herein can be fabricated utilizing various known and yet to be discovered materials and fabrication techniques. Examples of useful material classes include, but are not limited to, metallic material (e.g., metal alloys such as stainless steel), concrete (i.e., a cement-based material), and polymeric materials (e.g., plastics such as ABS or nylon). Examples of useful fabrication techniques include, but are not limited to, casting, forging, welding and the like for metallic materials and casting, molding, 3-D printing and the like for polymeric materials.

Discussed now are various advantageous aspects of material flow modifiers in accordance with embodiments of the disclosures made herein. One such advantageous aspect is that the incorporation of the helical passage bodies and central passage of the interior tubular body, which provide for rotational flow. Each of the helical passages uses the kinetic energy (i.e., energy from motion) and the flow's velocity to generate several stream vanes of material flow (i.e., helical flow streams) that unite at and beyond the outlet of the material flow modifier with each other and with the material flow of the central passage of the interior tubular body. These material flows can be focused by an outlet flow body of a material flow modifying apparatus. Beneficially, the outlet flow body enhances rotational flow and distributes an even (i.e., balanced) rotational flow profile about the centerline of the material flow modifier. Advantageously, inner sidewall conditions of material flow conduit (e.g., pipeline) downstream of a material flow modifier has a negligible effect on the rotational flow. Although there is a great deal of energy loss from a fluid going through certain disruptive material flow attributes of material flow conduits (e.g., a valve, fitting, or turbulence created going from passing fluid from one pipe size to another), rotational flow mitigates energy loss from these disruptive material flow attributes of material flow conduits by providing for concentration of material flow along the centerline of material flow conduit downstream of the material flow modifier thereby reducing sidewall drag and flow resistance.

Another advantageous aspect of material flow modifiers in accordance with one or more embodiments of the disclosures made herein is providing for "back-flow restriction". With such a back-flow restriction, if there is ever a back-flow surge in a system comprising one or more material flow modifiers in accordance with one or more embodiments of the disclosures made herein, the material flow modifier serves to reduce the back-flow (i.e., flow in the upstream direction) as compared to the material flow modifier being absent. Such soft reverse flow beneficially does not fully inhibit back-flow, which would create a shock wave (i.e., often referred to as a "water-hammer") that is harmful to the structures of the material flow conduit, and to the pumping devices. In a gravity flow system, this soft reverse flow is especially beneficial where tide water or flooding could reverse flow in a conventional pipeline system. More specifically, in a reverse flow scenario, flowable material enters the helical passages from the flow mixer and then dissipates into the 'funnel' of the interior tubular body, which creates a controlled flow blockage (i.e., controlled funnel flow). In this regard, soft reverse flow is enabled by inclusion of material flow passages defined between the exterior tubular body and the interior tubular body and by the funnel-shape of the interior tubular body itself.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A material flow modifier, comprising:
a central tubular body including a central passage having an inlet and an outlet and wherein the central passage expands along a length thereof from a first cross-sectional area adjacent the inlet thereof to a second cross-sectional area adjacent the outlet thereof larger than the first cross-sectional area; and
a plurality of vanes each extending in a helical manner around and at least partially along a length of the central tubular body, wherein an inner edge portion of each of the vanes is attached to the central tubular body, wherein each of the vanes extends outwardly from an outer surface of the central tubular body thereby defining a plurality of helical passages jointly defined by the central tubular body and respective adjacent ones of the vanes, wherein each helical passage has an inlet adjacent to the inlet of the central tubular body and an outlet having a cross-sectional area at least partially defined by a downstream end face of the respective adjacent ones of the vanes and an exterior surface of the central tubular body.

2. The material flow modifier of claim 1 wherein the cross-sectional area of the central passage expands linearly between opposing end portions of the central tubular body.

3. The material flow modifier of claim 1 wherein at least one of:
an upstream end face of each vane and an upstream end face of the central tubular body all lie in a common plane;
the downstream end face of each vane and a downstream end face of the central tubular body all lie in a common plane; and
the common planes extends perpendicular to the centerline longitudinal axis of the central tubular body.

4. The material flow modifier of claim 1 wherein:
each of the helical passages is partially defined by an inner wall; and
the inner wall of each of the helical passages is a respective portion of the central tubular body.

5. The material flow modifier of claim 4 wherein the cross-sectional area of the central passage of the central tubular body expands linearly between opposing end portions of the central tubular body.

6. The material flow modifier of claim 4 wherein the inner wall extends without discontinuity from the inlet of the central tubular body to the outlet of the central tubular body.

7. The material flow modifier of claim 6 wherein the cross-sectional area of the central passage expands linearly between opposing end portions of the central tubular body.

8. The material flow modifier of claim 1 wherein an entire portion of an outer perimeter edge of each of the vanes is a common radial distance from a centerline longitudinal axis of the central tubular body.

9. The material flow modifier of claim 8 wherein the cross-sectional area of the central passage of the central tubular body expands linearly between opposing end portions of the central tubular body.

10. The material flow modifier of claim 8 wherein:
each of the helical passages is partially defined by an inner wall; and
the inner wall of each of the helical passages is a respective portion of the central tubular body.

11. The material flow modifier of claim 10 wherein the cross-sectional area of the central passage of the central tubular body expands linearly between opposing end portions of the central tubular body.

12. The material flow modifier of claim 10 wherein the inner wall extends without discontinuity from the inlet of the central tubular body to the outlet of the central tubular body.

13. The material flow modifier of claim 12 wherein the cross-sectional area of the central passage expands linearly between opposing end portions of the central tubular body.

14. The material flow modifier of claim 1 wherein the central tubular body and the vanes are unitarily formed as a one-piece body.

15. The material flow modifier of claim 14 wherein an entire portion of an outer perimeter edge of each of the vanes is a common radial distance from a centerline longitudinal axis of the central tubular body.

16. The material flow modifier of claim 15 wherein the cross-sectional area of the central passage of the central tubular body expands linearly between opposing end portions of the central tubular body.

17. The material flow modifier of claim 15 wherein:
each of the helical passages is partially defined by an inner wall; and
the inner wall of each of the helical passages is a respective portion of the central tubular body.

18. The material flow modifier of claim 17 wherein the cross-sectional area of the central passage of the central tubular body expands linearly between opposing end portions of the central tubular body.

19. The material flow modifier of claim 17 wherein the inner wall extends without discontinuity from the inlet of the central tubular body to the outlet of the central tubular body.

20. The material flow modifier of claim 19 wherein the cross-sectional area of the central passage expands linearly between opposing end portions of the central tubular body.

21. The material flow modifier of claim 1, further comprising:
an exterior tubular body having a central passage thereof extending therethrough, wherein the central tubular body and the vanes extends through the central passage of the exterior tubular body such that the helical passages extend at least partially along a length of the exterior tubular body, and wherein an outer edge portion of each of the vanes is attached to the exterior tubular body such that at least a portion of each of the helical passages is jointly defined by the exterior tubular body, the central tubular body and the respective adjacent ones of the vanes.

22. The material flow modifier of claim 21 wherein the cross-sectional area of the central passage expands linearly between opposing end portions of the central tubular body.

23. The material flow modifier of claim 21 wherein at least one of:
an upstream end face of each vane and an upstream end face of the central tubular body all lie in a common plane;
the downstream end face of each vane and a downstream end face of the central tubular body all lie in a common plane; and
the common planes extends perpendicular to the centerline longitudinal axis of the central tubular body.

24. The material flow modifier of claim 21 wherein:
each of the helical passages is partially defined by an inner wall; and
the inner wall of each of the helical passages is a respective portion of the central tubular body.

25. The material flow modifier of claim 21 wherein an entire portion of an outer perimeter edge of each of the vanes is a common radial distance from a centerline longitudinal axis of the central tubular body.

26. The material flow modifier of claim 21 wherein the exterior tubular body, the central tubular body and the vanes are unitarily formed as a one-piece body.

* * * * *